United States Patent
Griffith et al.

(10) Patent No.: US 10,055,780 B1
(45) Date of Patent: Aug. 21, 2018

(54) DYNAMIC LIST VIEW INVENTORY IN COMMERCE APPS

(71) Applicant: Gametime, San Francisco, CA (US)

(72) Inventors: Brad Griffith, San Francisco, CA (US); Richard Lowenberg, San Francisco, CA (US); Jairo Avalos, San Francisco, CA (US); Brendan Winter, Oakland, CA (US)

(73) Assignee: Gametime, San Francisco, CA (US)

( * ) Notice: Subject to any disclaimer, the term of this patent is extended or adjusted under 35 U.S.C. 154(b) by 0 days.

(21) Appl. No.: 14/456,775

(22) Filed: Aug. 11, 2014

(51) Int. Cl.
*G06Q 30/06* (2012.01)
*G06Q 30/08* (2012.01)

(52) U.S. Cl.
CPC ......... *G06Q 30/0635* (2013.01); *G06Q 30/08* (2013.01)

(58) Field of Classification Search
CPC ............................... G06Q 30/06; G06Q 30/08
USPC ............................................. 705/26, 27, 28
See application file for complete search history.

(56) References Cited

U.S. PATENT DOCUMENTS

| | | | | |
|---|---|---|---|---|
| 5,333,257 | A | * | 7/1994 | Merrill ................ G06F 17/5004 345/419 |
| 2008/0255889 | A1 | * | 10/2008 | Geisler .................. G06Q 10/02 705/5 |
| 2012/0005028 | A1 | * | 1/2012 | Stone et al. ................ 705/14.71 |
| 2012/0078667 | A1 | * | 3/2012 | Denker et al. .................... 705/5 |

OTHER PUBLICATIONS

Dictionary.com definition of perspective; http://www.dictionary.com/browse/perspective.*
New Event Ticketing Site Applies Priceline Model to Buying Tickets, Jennifer Van Grove, available at https://mashable.com/2010/12/15/scorebig/#LcQShZLogaq6; Dec. 15, 2010 (Year: 2010).*

* cited by examiner

*Primary Examiner* — Ming Shui
(74) *Attorney, Agent, or Firm* — FSP LLC

(57) ABSTRACT

A ticket transaction system includes auction logic coupled with a database of ticket inventory. The auction logic periodically executes online auctions among sellers of the ticket inventory to determine placement of tickets in a user interface view to potential buyers of the tickets. Real time event engine logic coupled with the auction logic provides real time updates of ticket inventory availability to mobile devices over a machine network. The system is adapted with logic to substitute in real time a next best value ticket for a sold ticket in the user interface.

6 Claims, 8 Drawing Sheets

DYNAMIC LIST VIEW INVENTORY IN COMMERCE APPS

CROSS-REFERENCE TO RELATED APPLICATIONS

Not Applicable.

BACKGROUND OF THE INVENTION

Mobile applications that make available lists of inventory for purchase may suffer from a "refresh paradigm" problem in which up to date data on what inventory is actually available is not made available in timely fashion to the phone for display to the end user. It is desirable that any inventory viewed on the phone is actually available for purchase on the server(s), and not already purchased.

BRIEF SUMMARY OF THE INVENTION

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

Figure 1:
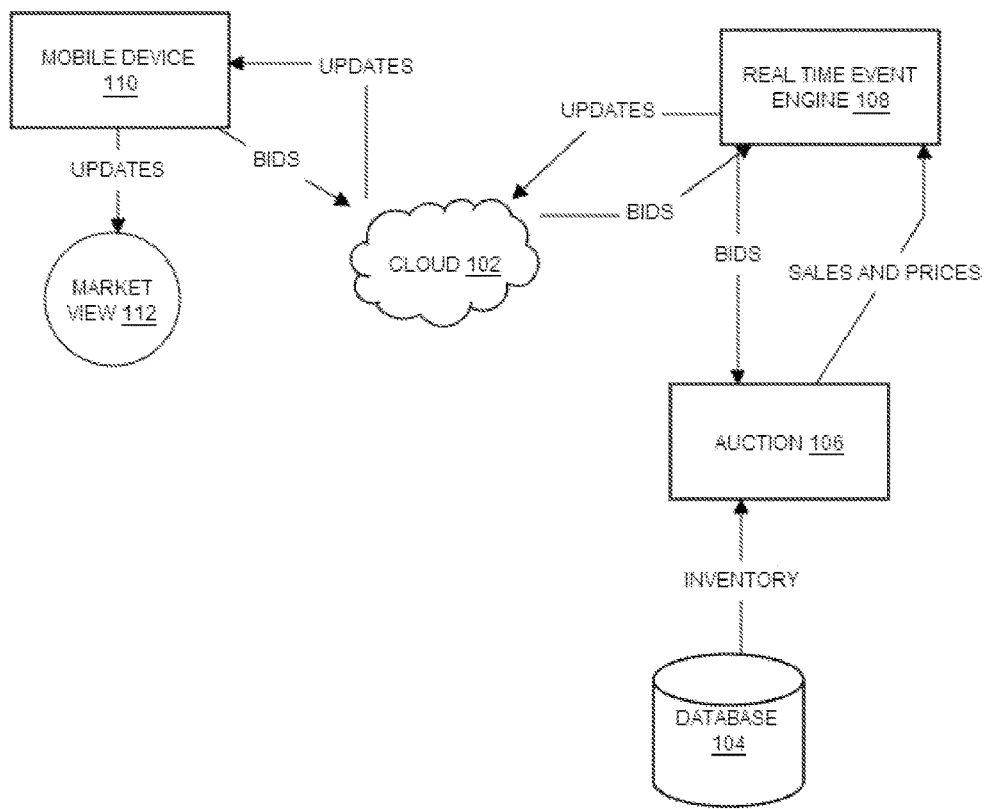
FIG. 1 is a system diagram of an embodiment of a real time inventory transaction system.

"application" in this context refers to logic that can be independently installed, accessed, and removed from a device, and which executes at lower permission levels and within confines as to functionality and device resource utilization as determined by operating system software. Often referred to as "regular" application logic, as opposed to driver, applet, or system logic; also, logic that causes a computer to perform tasks beyond the basic operation of the computer itself. The term "application" may be abbreviated in some contexts to simply "app". An application may be logic "auction" in this context refers to logic to implement the selective and competitive curration of items for presentation to purchasers. An auction may be implemented by collecting bids from the sellers of items, and to apply a time frame/time limit to the bidding, and to confirm selection of winning items for placement for sale.

"cloud" in this context refers to a network of machines available to client devices (e.g., mobile devices) to provide services over the network "database" in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

"HTTP" in this context refers to Hypertext Transfer Protocol, a well known application protocol for distributed, collaborative, hypermedia information systems.

"inventory" in this context refers to a machine database of items available for transaction "mobile device" in this context refers to any device that includes logic to communicate over a machine network and having a form factor compatible with being carried conveniently by a single human operator. Mobile devices typically have wireless communications capability via WAPs or cellular networks "real time" in this context refers to of or relating to a system in which inputs and/or events are processed within a time frame (e.g., milliseconds) so that the inputs or results of processing the inputs are available virtually immediately (from a human user perspective)

"real time event engine" in this context refers to the definition provided in the Specification (below).

"TCP" in this context refers to (Transmission Control Protocol) a primary protocol of the Internet protocol suite, enabling reliable, ordered delivery of a stream of octets from one device to another over device networks, such as the Internet.

"WAP" in this context refers to (wireless access point) a device that makes a wireless interface to a network available to client devices. Examples of wireless network access points are WiFi "hotspots" and 3G and 4G cellular hotspots.

Description

A system is described in which dynamic inventory changes are made available to mobile applications with minimal delay. In particular, a server system comprising a database of inventory for sale is coupled with auction logic to accept dynamic bidding on various items of inventory. An auction is conducted among sellers of inventory, and winners receive placement in an inventory list presented to buyers. The system is configured to further interact sales transactions from buyers into update signals to mobile applications of other potential buyers, via a real-time gaming interface. The resulting interactions may result in "live" updating of assets that may be purchased from a mobile platform, such as a phone.

In one embodiment, the system implements a socket-type interface, similar to those utilized in online gaming applications (e.g., first person shooter), but in the context of continuous and dynamic bidding by sellers of inventory on an online system. In one embodiment, the system implements web sockets logic tied to server auction logic that executes at periodic time intervals (e.g., every x seconds). Mobile applications interfaced to the auctions via the web sockets logic update a machine human interface to an online marketplace that updates in real time, reflecting the current availability and price of items in the marketplace, where the items presented to the buyers, and potentially placement of the items in a user interface, are set by the auction among sellers. Not only is the list updated to reflect purchases in real time (removing purchased items from the list); it may also be updated each time an auction for tickets to the event concludes on the server, to reflect winning placements; it may also be updated with items similar in "value" to purchased items, where the similar items were "runners up" in the auction and didn't warrant initial placement in the list.

WebSocket is a protocol providing full-duplex communications channels over a single TCP connection. The WebSocket protocol was standardized by the IETF as RFC 6455. WebSocket is designed to be implemented in web browsers and web servers, but it can be used by any client or server application. The WebSocket Protocol is an independent TCP-based protocol. The WebSocket protocol makes possible more interaction between a browser and a web site, facilitating live content and the creation of real-time games. This is made possible by providing a standardized way for the server to send content to the browser without being solicited by the client, and allowing for messages to be passed back and forth while keeping the connection open. In this way a two-way (bi-directional) ongoing conversation can take place between a browser and the server. A similar effect may be achieved for embodiments of the described system utilizing other technologies such as Comet. Comet is a web application model in which a long-held HTTP request allows a web server to push data to a browser, without the browser explicitly requesting it. Comet is an umbrella term, encompassing multiple techniques for achieving this interaction. Herein any machine logic providing the described communication features for web clients will be referred to as a "real-time event engine".

The system may be utilized to implement real time transactions for the re-sale of tickets to upcoming events, such as sporting events and concerts. Ticket pricing is set primarily by the sellers via the auction process. It may also be influenced or dynamically adapted according to a number of factors, such as quality of the seating, previous pricing for comparable seating, and time left to the event. The following are some factors that the system may apply to affect the pricing of a ticket:

ticket pricing is influenced by current time relative to event time
  ticket pricing is influenced by projected crowd and capacity
  ticket pricing is influenced by recent transaction prices and trends; including velocity and acceleration of sales
  ticket pricing is influenced by weather and other exogenous events (traffic, parking, availability of transit)
  ticket pricing is influenced by ticket quality (e.g., ticket section, seat number)
  ticket pricing is influenced by list price of ticket
  ticket pricing is influenced by bid landscape for similar tickets
  ticket pricing is influenced by ticket holder location
  ticket pricing is influenced by ticket holder transaction history
  ticket pricing is influenced by macroeconomic conditions In one embodiment, the system accumulates demand signals from users interested in acquiring event tickets. The system produces and instant price and offer which is presented to the ticket holder. The ticket holder has the option to accept the offer via single action/interaction with their mobile device. If the ticket holder does not accept the offer, they may continue to receive future offers based on continuous monitoring of the market for their ticket by the system, leading to updated offers and alerts.

One embodiment of the system enables a process of competitive pricing for tickets to an upcoming event for which the time window is closing. The system may influence and present the price of tickets so that ticket holders can complete a ticket transfer with a single action. The presented prices are influenced by various factors in a unique way. A set of sensors may output signals responsive to environmental factors. These may include weather conditions, crowd conditions, parking and transportation conditions, bid velocity and acceleration, and other factors.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Drawings

Figure 2:
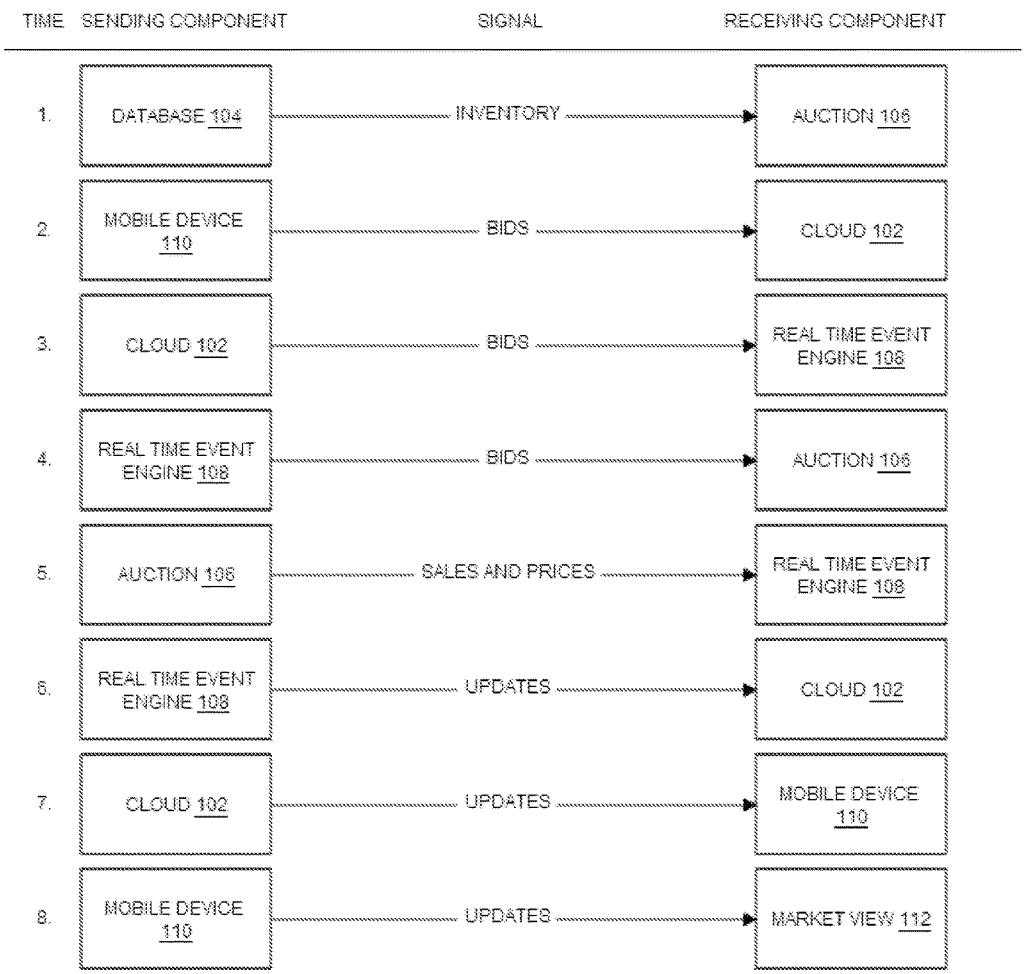
FIG. 2 is an action flow diagram of an embodiment of a real time inventory transaction process.
Figure 3:
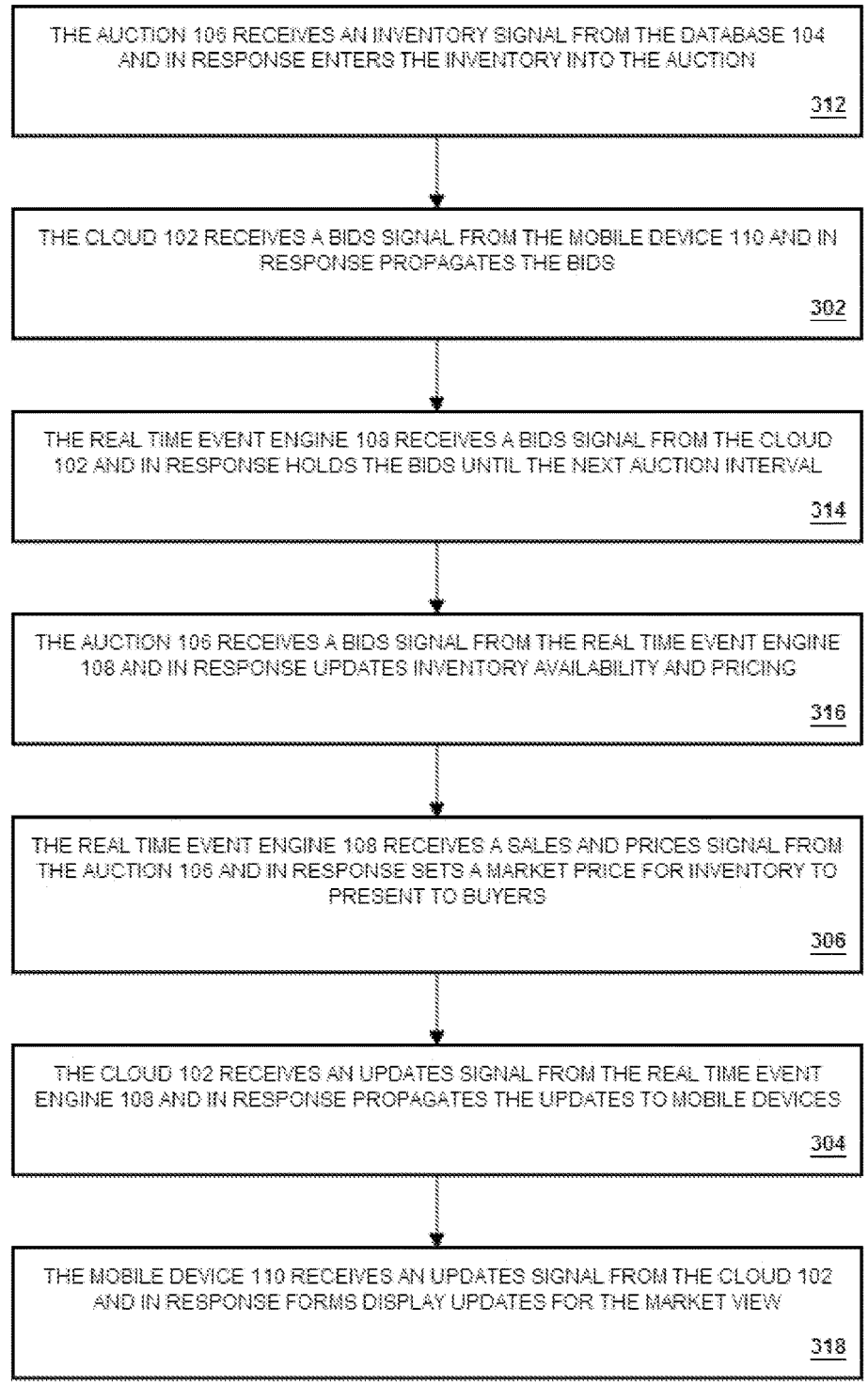
FIG. 3 is a flow chart of an embodiment of a real time inventory transaction process.
Figure 4:
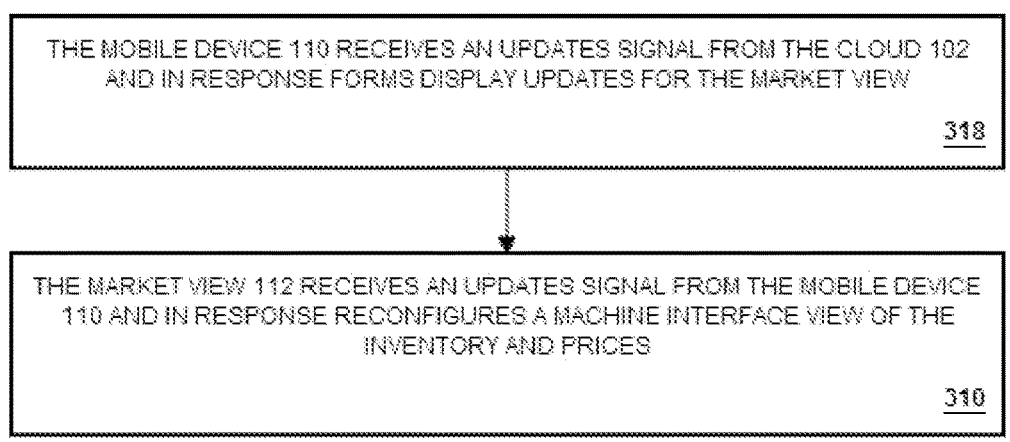
FIG. 4 is a flow chart of an embodiment of a real time inventory transaction process.

FIG. 1 is a system diagram of an embodiment of a real time inventory transaction system. FIG. 2 is an action flow diagram of an embodiment of a real time inventory transaction process. FIG. 3-4 is a flow chart of an embodiment of a real time inventory transaction process. The system comprises cloud 102, inventory 104, auction 106, real time event engine 108, mobile device 110, and market view 112. For simplicity of illustration, the same mobile device is utilized for both seller and buyer transactions in this example. In practice, typically different mobile devices would be involved on the buy side and sell side of transactions.

To determine which inventory to present for sale to potential sellers, and placement of said inventory in a list view, the auction logic 106 receives an inventory signal from the inventory 104 and in response enters the inventory into the auction process (312). Bids from sellers are collected for the inventory (302, 314, 316), determining market prices for the inventory (306). If the system is used to transact tickets for resale to events, the ticket prices presented to potential buyers may be based on a number of factors, primarily the price set at auction, but also factor such as the quality of the seating, time left to the event, and sales of comparable tickets. The real time event engine 108 receives a sales and prices signal from the auction 106 and in response forms market updates to various connected mobile devices (306). The cloud 102 receives an updates signal from the real time event engine 108 and in response propagates the updates to mobile devices (304). The mobile device 110 receives updates from the cloud 102 and in response forms display updates for the market view (318). The market view 112 receives updates from the mobile device 110 and in response re-configures a machine interface view of the inventory and prices (310).

Periodically (e.g., every few seconds) an auction may be run for a set of inventory, such as tickets for a particular event. Multiple auctions may be executing "simultaneously" (e.g., at the same time from the perspective of the mobile devices). Users of the mobile devices (sellers) may bid for placement of items of inventory to be presented to potential buyers, such as tickets. Once an auction concludes, the winners may be presented for sale to potential buyers. The cloud 102 receives sales transaction signals from the mobile device(s) 110 of the buyers and in response propagates the sales transaction signals to the real time event engine, which sends back updates to the inventory market view in real time, for example using a real time sockets interface.

One feature of the system is that once a ticket (or other inventory item) is sold, a "next best value" item may replace the sold item in the market view of inventory presented to potential buyers. Note that it is not always possible to substitute identical items for sold items in the market view. This is because tickets are often tied to corresponding particular seats at a venue. Thus, a "next best value" item may be substituted for a sold item. Factors for determining "value" for tickets in particular are described above.

Figure 5:
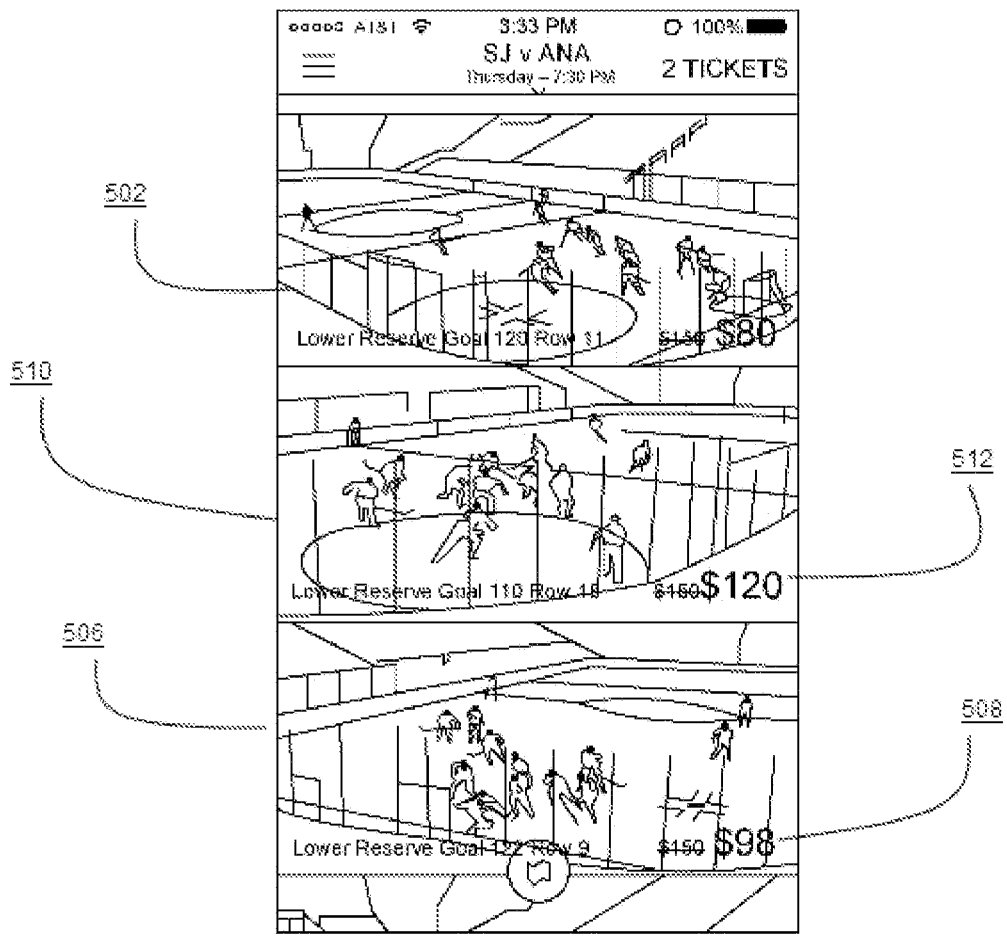
FIG. 5 illustrates a real time machine human interface for inventory transacted online

FIG. 5 illustrates a real time machine human interface for inventory transacted online. This interface is typically presented to a human user via a mobile device, such as a smartphone. A perspective view 502 from seats linked to first tickets is displayed. A perspective view linked to seats for second tickets 510 and a price 512 set via an auction executed on a server system are also displayed. A process of determining this price and providing real time updates to the mobile device from the auction system is described previously in conjunction with FIG. 1-4. Further provided is a perspective view 506 for seats to the same event, linked to third tickets that have similar characteristics in terms of quality (proximity to the action, view, etc.) to the first tickets. A price 508 generated from the online auction process is displayed for the third tickets. The user may elect to operate the machine interface to buy at the display price 508.

Figure 6:
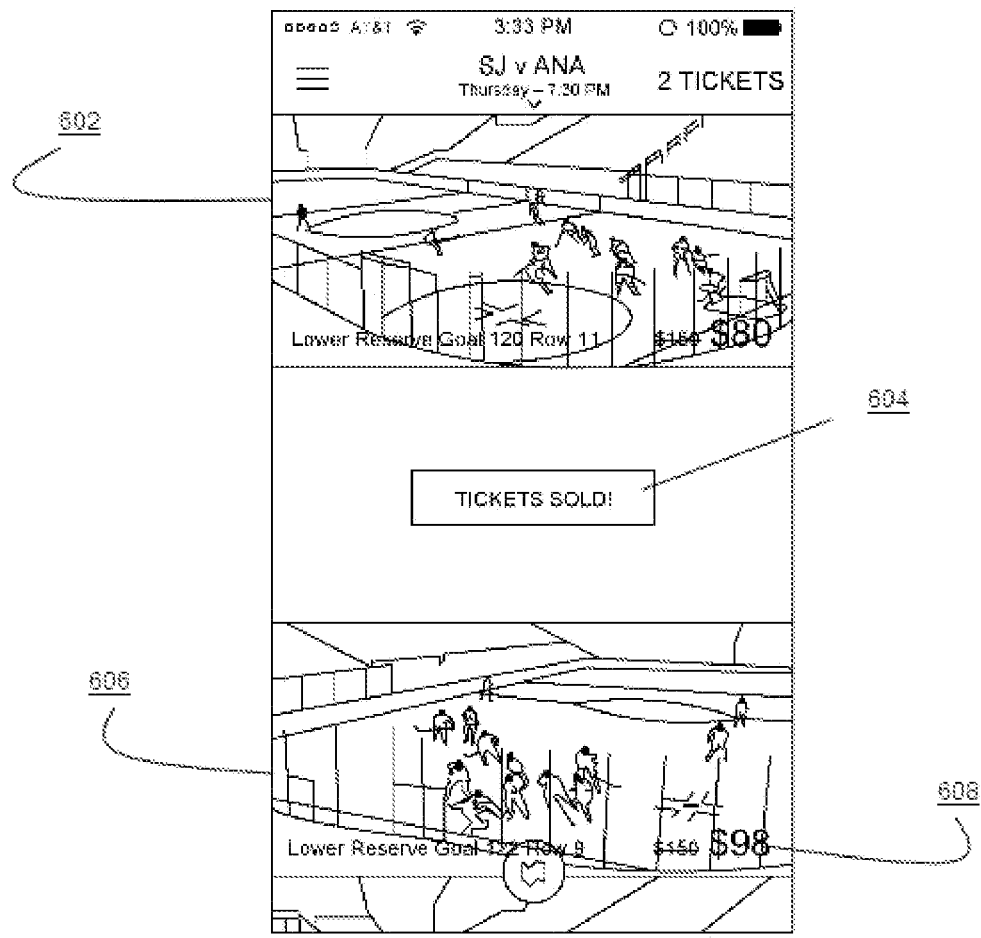
FIG. 6 illustrates a real time machine human interface for inventory transacted online

FIG. 6 illustrates a real time machine human interface for inventory transacted online. This interface is typically presented to a human user via a mobile device, such as a smartphone. A perspective view 602 (corresponds to 502 in FIG. 5) from seats linked to first tickets is displayed. Second tickets 510 are sold at or near the price 512 set via an auction executed on a server system, as described previously in conjunction with FIG. 1-4. A message 604 is displayed, in response to a real time update provided to the mobile device from the server system via a real time communication mechanism such as web sockets. Further provided is a perspective view 606 (corresponds to 506 in FIG. 5) for seats to the same event, linked to third tickets that have similar characteristics in terms of quality (proximity to the action, view, etc.) to the first tickets. A price 608 (corresponds to 508 in FIG. 5) generated from the online auction process is displayed for the third tickets. The user may elect to operate the machine interface to buy at the display price 608. In one embodiment, a listing for a ticket comparable in "value" may be substituted for the listing of the sold ticket, after an indication of the sale 604 is presented to the user of the mobile device.

Figure 7:
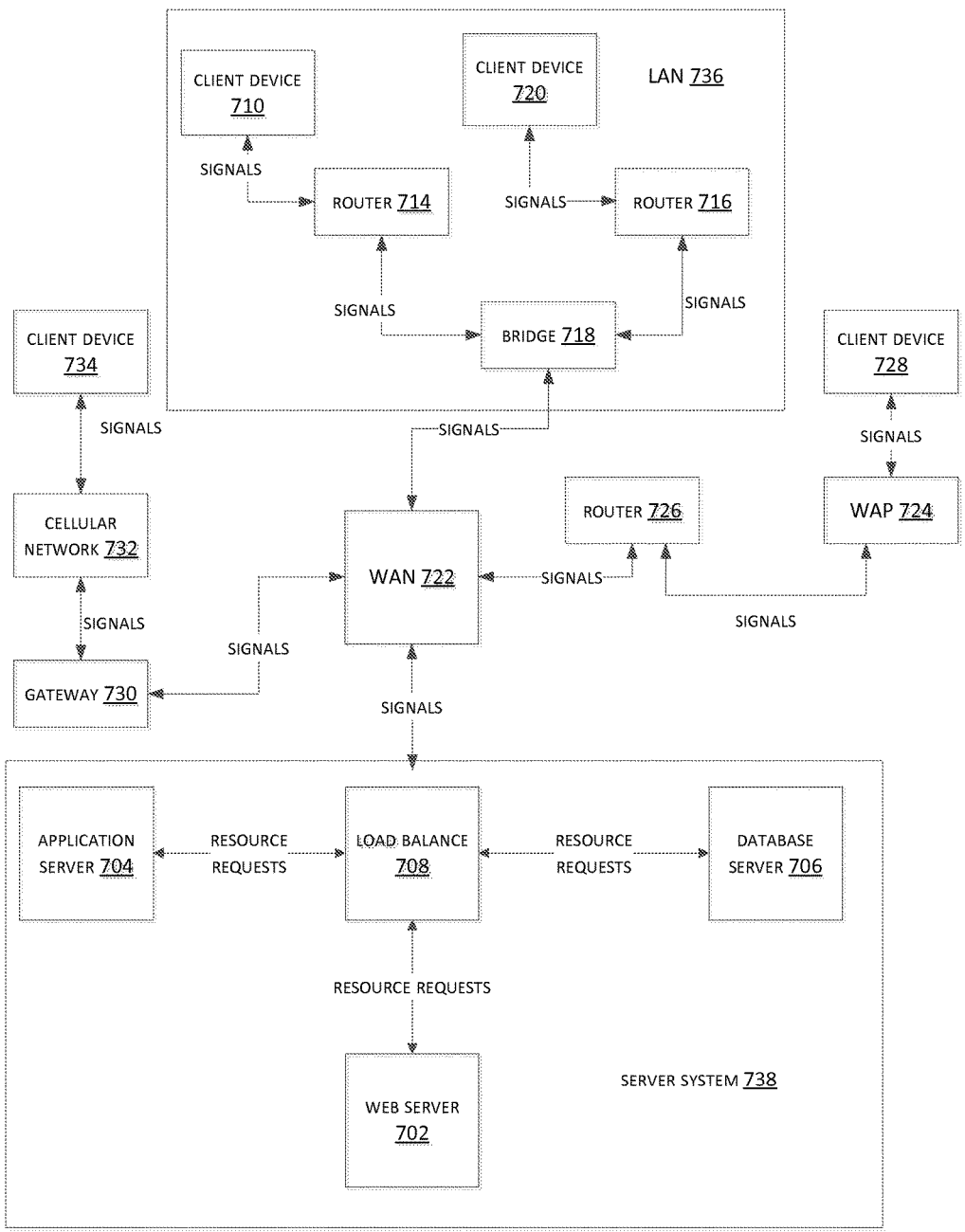
FIG. 7 illustrates an embodiment of a machine network to carry out aspects of the described transaction and user interface update processes.

FIG. 7 illustrates an embodiment of a machine network to carry out aspects of the described transaction and user interface update processes. Several network access technologies between client devices and server resources are illustrated, including cellular network 732, LAN 736, and WAP 724. Signals representing server resource requests are output from client devices 710, 720, 728, and 734 to the various access networks, from which they are propagated to a WAN 722 (e.g., the Internet) and from there to a server system. These signals are typically encoded into standard protocols such as Internet Protocol (IP), TCP/IP, and HTTP. When the clients are part of a LAN 736, the signals may be propagated via one or more router 714 716 and a bridge 718. A router 726 may propagate signals from the WAP 724 to the WAN 722. A gateway 730 may propagate signals from the cellular network 732 to the WAN 722. The server system 738 in this example comprises a number of separate server devices, typically each implemented in the separated machine, although this is not necessarily the case. The signals from the client devices are provided via a load balancing server 708 to one or more application server 704 and one or more database server 716. Load balancing server 708 maintains an even load distribution to the other server, including web server 702, application server 704, and database server 706. Each server in the drawing may represent in effect multiple servers of that type. The load balancing server 708, application server 704, and database server 706 may collectively implement an embodiment of the system described herein. The signals applied to the database server 706 may cause the database server 706 to access and certain memory addresses, which correlates to certain rows and columns in a memory device. These signals from the database server 706 may also be applied to application server 704 via the load balancing server 708. Signals applied by the application server 704, via the load balancing server 708, to the web server 702, may result in web page modifications which are in turn communicated to a client device, as described herein in regards to user interface and interaction signals to and from a client device. The system described herein may thus be implemented as devices coordinated on a LAN, or over a wide geographical area utilizing a WAN or cellular network, or over a limited area (room or house or store/bar) utilizing a WAP. Features of client logic to interact with the described system may thus be implemented, for example, as an application (app) on a mobile phone interfacing to a network in one of the manners illustrated in this figure. The system described herein may be implemented as a pure or hybrid peer to peer system in a local or widely distributed area.

Figure 8:
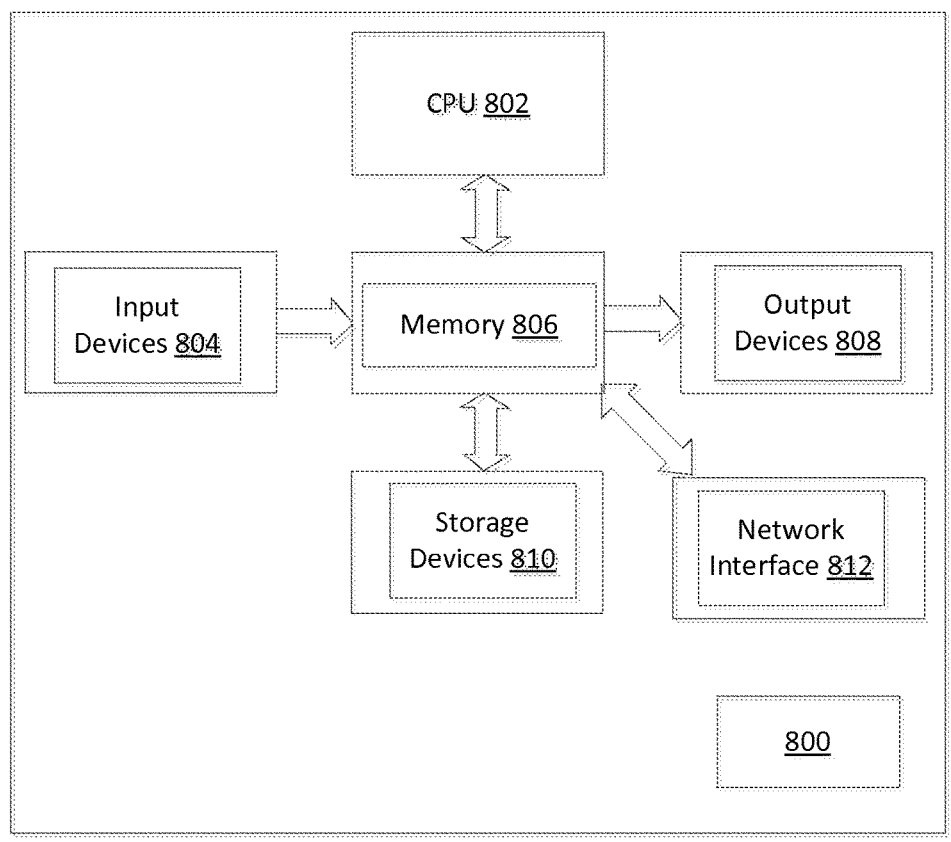
FIG. 8 illustrates an embodiment of a device to carry out aspects of the described system

FIG. 8 illustrates an embodiment of a device to carry out aspects of the described system. Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory devices 806. The memory devices 806 is typically what is known as a first or second level memory device, providing for storage (via configuration of matter or states of matter) of signals received from the input devices 804, instructions and information for controlling operation of the CPU 802, and signals from storage devices 830. Information stored in the memory devices 806 is typically directly accessible to processing logic 802 of the device. Signals input to the device cause the reconfiguration of the internal material/energy state of the memory device 806, creating in essence a new machine configuration, influencing the behavior of the device 800 by affecting the behavior of the CPU 802 with control signals (instructions) and data provided in conjunction with the control signals. Second or third level storage devices 830 may provide a slower but higher capacity machine memory capability. Examples of storage devices 830 are hard disks, optical disks, large capacity flash memories or other non-volatile memory technologies, and magnetic memories. The processing logic 802 may cause the configuration of the memory 806 to be altered by signals in storage devices 830. In other words, the CPU 802 may cause data and instructions to be read from storage devices 830 in the memory 806 from which may then influence the operations of CPU 802 as instructions and data signals, and from which it may also be provided to the output devices 808. The CPU 802 may alter the content of the memory of 806 by signaling to a machine interface of memory 806 to alter the internal configuration, and then converted signals to the storage devices 830 to alter its material internal configuration. In other words, data and instructions may be backed up from memory 806, which is often volatile, to storage devices 830, which are often non-volatile. Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers). Communication interface 812 receives signals from the memory 806 and converts them into electrical, optical, or wireless signals to other machines, typically via a machine network, for example via one such as the embodiment illustrated in FIG. 7. Communication interface 812 also receives signals from the machine network and converts them into electrical, optical, or wireless signals to the memory 806.

What is claimed is:

1. A ticket transaction system, comprising:

at least one computer server comprising non-transitory auction logic coupled with a database of ticket inventory, the auction logic operable to periodically execute online auctions among sellers of the ticket inventory;

the at least one computer server comprising non-transitory real time event engine logic coupled with the auction logic, operable to push periodically concluded updates from the auction logic to an ordered list of ticket selection controls in a mobile device user interface view on a plurality of mobile devices;

the periodically concluded updates comprising real time substitutions of a next best value ticket for a sold ticket in the ordered list of ticket selection controls, and a reordering of the ordered list of ticket selection controls on the user interface based on an outcome of each periodically concluded auction;

the ticket selection controls each comprising a perspective view of an event to which each ticket selection provides access, the perspective view for each ticket selection control being a view of the event from a perspective of a person located in an area of the event associated with the ticket selection control, each ticket selection control operable as a single-action control to transfer access rights to the location;

logic to replace a perspective view correlated with the sold ticket with an indication the sold ticket is no longer available, before substituting the next best value ticket for the sold ticket; and logic to adjust a sale price presented along with each ticket selection control, the sale price adjusted according to a time remaining before the event to which the ticket selection controls provide access.

2. The system of claim 1, further comprising:

the real time event engine logic utilizing web sockets or Comet logic to provide the real time substitutions to the mobile device interfaces.

3. The system of claim 1, further comprising:

non-transitory logic to adjust the sale price according to predicted environmental conditions at the event.

4. The system of claim 3, further comprising:

non-transitory logic to adjust the sale price according to projected crowd and capacity at the event.

5. The system of claim 3, further comprising:

non-transitory logic to adjust the sale price according to velocity and acceleration of sales of comparable tickets to tickets represented in the ticket selection controls.

6. The system of claim 3, further comprising:

non-transitory logic to adjust the sale price according to one or more of weather, traffic, parking, or availability of transit to or for the event.

* * * * *